(12) United States Patent
Schambre et al.

(10) Patent No.: US 6,893,095 B2
(45) Date of Patent: May 17, 2005

(54) HORIZONTALLY PIVOTING HEADREST FOR MOTOR VEHICLE

(75) Inventors: John E Schambre, Canton, MI (US); Raymond C Deyonker, Wixom, MI (US); Marcus G Washington, Southfield, MI (US); Michael O Forker, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/146,084

(22) Filed: May 15, 2002

(65) Prior Publication Data

US 2003/0214168 A1 Nov. 20, 2003

(51) Int. Cl.[7] .......................... A47C 7/36; B60R 21/055
(52) U.S. Cl. ........................ 297/406; 297/391
(58) Field of Search .............................. 297/391, 406, 297/407, 408

(56) References Cited

U.S. PATENT DOCUMENTS

| | | | |
|---|---|---|---|
| 4,576,411 A | * | 3/1986 | Kitamura ................... 297/353 |
| 4,576,413 A | | 3/1986 | Hatta |
| 4,623,166 A | | 11/1986 | Andres et al. |
| 4,711,494 A | | 12/1987 | Duvenkamp |
| 4,762,367 A | | 8/1988 | Denton |
| 4,822,102 A | | 4/1989 | Duvenkamp |
| 4,881,777 A | * | 11/1989 | Dorshimer .............. 297/406 X |
| 4,910,291 A | | 3/1990 | Yamamoto et al. |
| 5,011,225 A | | 4/1991 | Nemoto |
| 5,145,233 A | | 9/1992 | Nagashima |
| 5,669,668 A | | 9/1997 | Leuchtmann |
| 5,752,742 A | | 5/1998 | Kerner et al. |
| 5,918,940 A | | 7/1999 | Wakamatsu et al. |
| 6,074,010 A | | 6/2000 | Takeda |
| 6,113,192 A | | 9/2000 | Schneider |
| 6,129,421 A | | 10/2000 | Gilson et al. |
| 6,192,565 B1 | | 2/2001 | Tame |
| 6,290,298 B1 | | 9/2001 | Lee |
| 6,299,254 B1 | | 10/2001 | Dinh et al. |
| 6,302,485 B1 | | 10/2001 | Nakane et al. |
| 6,352,285 B1 | * | 3/2002 | Schulte et al. .............. 280/756 |

* cited by examiner

Primary Examiner—Anthony D. Barfield
(74) Attorney, Agent, or Firm—Ralph E. Smith

(57) ABSTRACT

A headrest assembly for a motor vehicle comprises a headrest pivotable between first and second positions. The first position is generally proximate a seatback, and the second position is generally proximate a side wall.

4 Claims, 2 Drawing Sheets

HORIZONTALLY PIVOTING HEADREST FOR MOTOR VEHICLE

TECHNICAL FIELD OF THE INVENTION

This invention relates generally to headrests for motor vehicle seats, and relates more specifically to a headrest that pivots from a side support bar.

BACKGROUND OF THE INVENTION

Many motor vehicles, particularly sport utility vehicles, are equipped with rear seats that can be moved from a seating configuration, in which passengers can sit in the seat, to a so-called "load floor" configuration where the back support of the seat is folded downwardly to assume a horizontal orientation and thereby facilitate cargo stowage in the van. Typically, locking mechanisms are provided for holding the seat in the seating configuration, and the locking mechanisms can be released to permit moving the seat to the load floor configuration.

Various arrangements have been proposed for retracting a headrest of the seat in order to provide the seat with a more compact profile when folded. For example, U.S. Pat. No. 5,918,940 shows several embodiments of a seat having an adjusting mechanism for adjusting the height of a headrest according to the pivoting of a seatback relative to a seat cushion.

SUMMARY OF THE INVENTION

The present invention is a headrest assembly for a motor vehicle. The headrest assembly comprises a headrest pivotable from a first position generally proximate a seatback to a second position generally proximate a side wall.

Accordingly, it is an object of the present invention to provide a headrest assembly of the type described above that provides support for an operator of the motor vehicle.

Another object of the present invention is to provide a headrest assembly of the type described above that facilitates the storage of relatively compact rear seats of the motor vehicle.

Still another object of the present invention is to provide an assembly of the type described above which is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
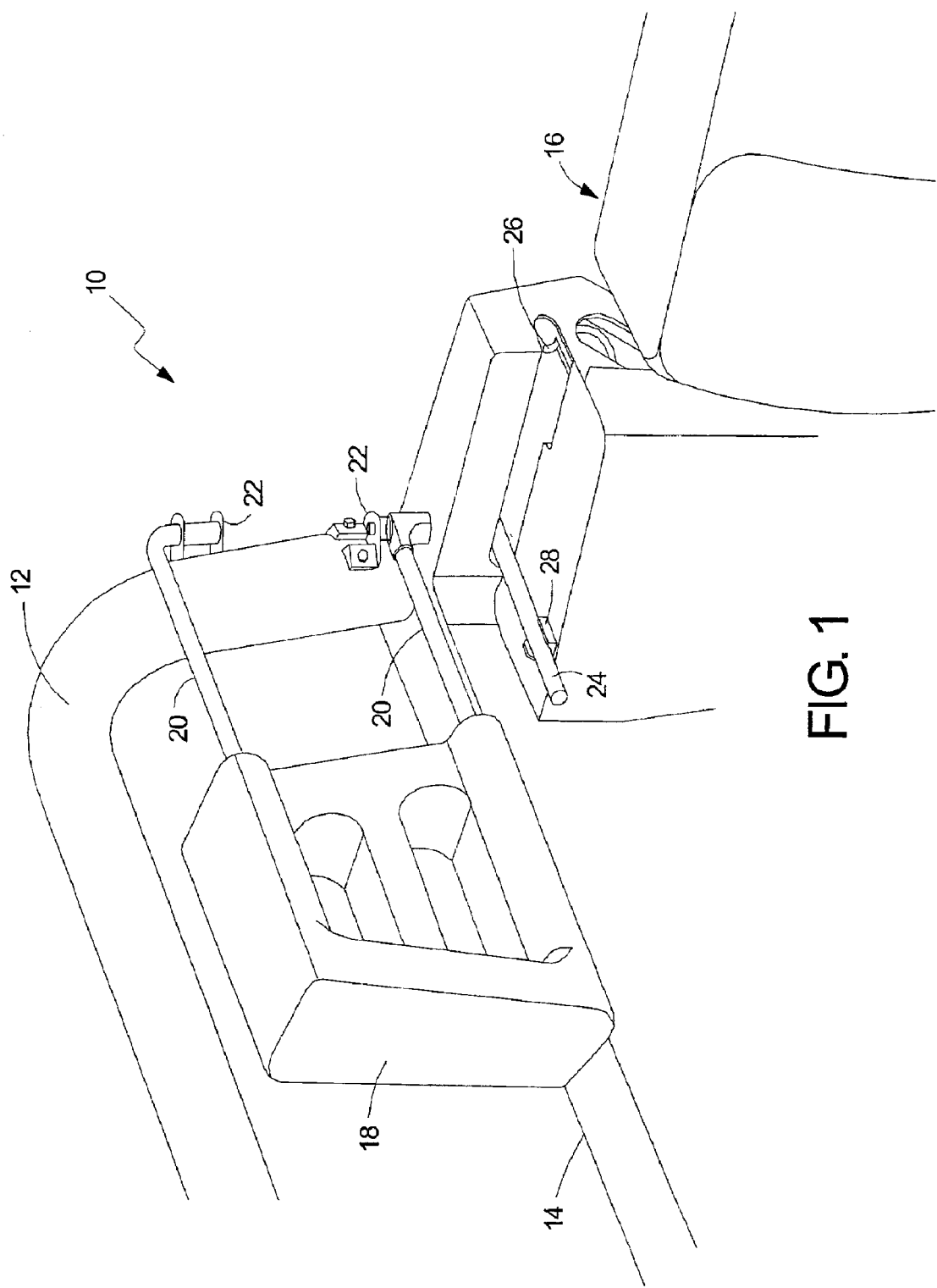
FIG. 1 is a perspective view of a headrest assembly according to the present invention in a first, stowed position.

FIG. 1 shows one embodiment of a headrest assembly 10 according to the present invention for a motor vehicle. In particular, the headrest assembly 10 is adapted for use in a vehicle having a roll bar 12 extending from a position generally at or near an interior side wall 14 and above a seat including a seatback 16.

The headrest assembly 10 comprises a padded headrest 18 and one or more preferably tubular supports 20. The supports 20 may be connected to the headrest 18 in any conventional manner, and extend from the headrest to one or more mounting brackets 22 which are preferably disposed proximate the roll bar 12. It should be appreciated that a separate mounting bracket may be provided for each support 20, or a single mounting bracket may be provided with accommodations for each support.

The supports 20 extend in a generally horizontal plane, while the mounting brackets 22 define a generally vertical axis about which the supports are pivotable. The headrest 18 is thus pivotable about the mounting brackets 22 from a first, stowed position shown in FIG. 1 to a second, use position shown in FIG. 2. In the use position, the headrest 18 is disposed generally proximate the seatback 16 and normally spaced thereabove.

Figure 2:
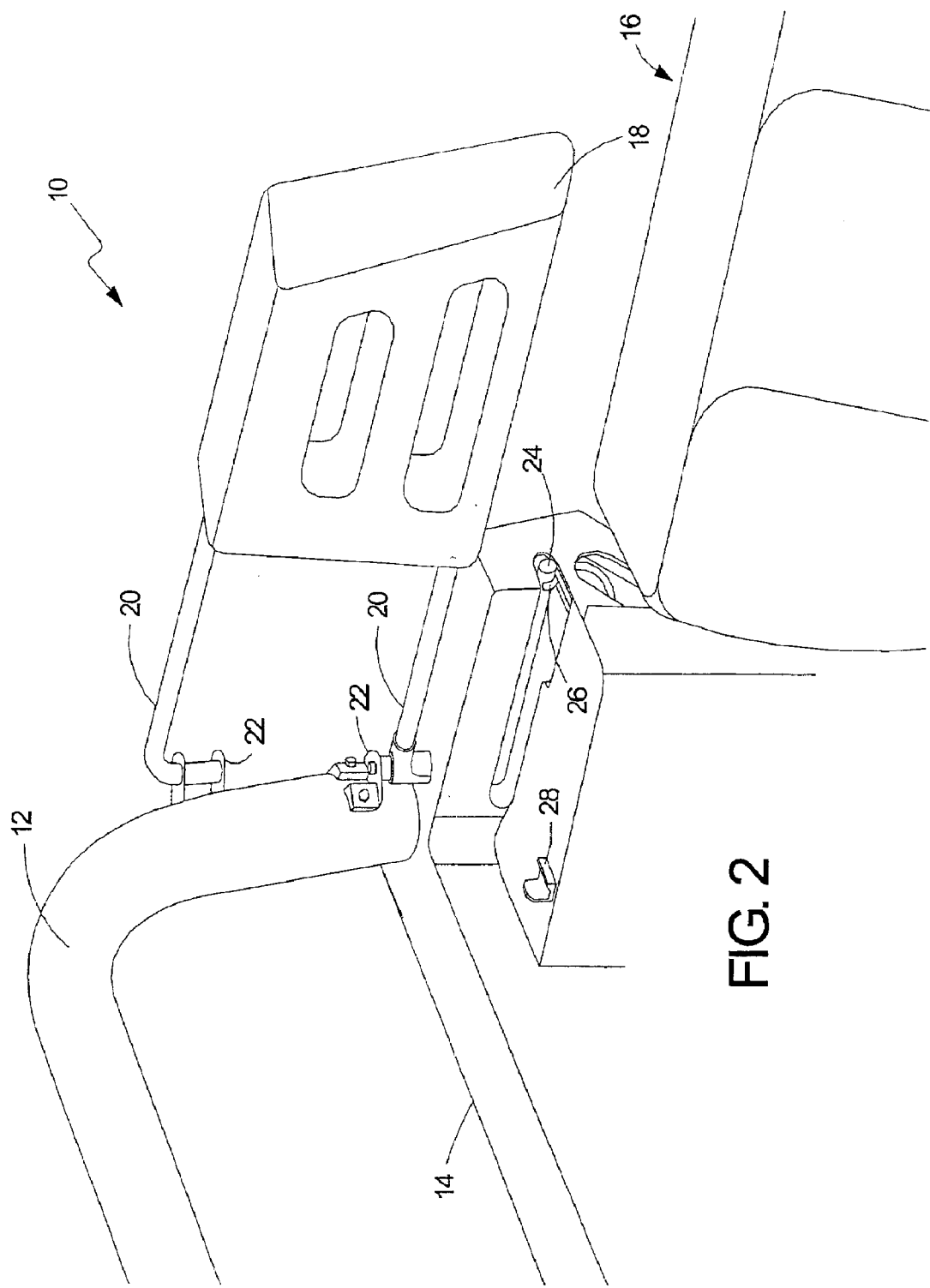
FIG. 2 is a perspective view of the headrest assembly in a second, use position.

FIG. 2 shows the headrest 18 in the use position. In this position, the headrest 18 is disposed generally proximate the side wall 14 of the motor vehicle. A latching bar 24 is preferably connected to the lower support 20 so as to move therewith. The latching bar 24 is selectively engagable with a latch 26 to secure the headrest 18 in the use position. A detent 28 provides is engagable with the latching bar 24 to perform a similar function and hold the headrest 18 is the stowed position, as shown in FIG. 1. It should be appreciated, of course, that the latch 26 and the detent 28 may be interchanged, or that the present invention may be equipped with two latches or two detents.

With the headrest 18 in the stowed position, the seatback 16 may be moved or removed from the vehicle altogether in order to present an increased available load floor. This may be advantageous, for example, in transporting large or cumbersome objects. Because the headrest is not connected to the seatback, moreover, the seatback offers a relatively compact profile to facilitate storage inside or outside of the vehicle.

It should be appreciated that while the embodiment of the headrest assembly described herein is preferably manually pivotable, the present invention also contemplates that the headrest 18 may be translated by any powered means such as an electric motor. Furthermore, the brackets 22 may be attached to any support structure such as B- or C-pillars.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A headrest assembly adapted to movably mount in a motor vehicle, the headrest assembly comprising:

a support member adapted to pivotally connect to the motor vehicle;

a latching bar rigidly connected to the support member and adapted for pivotal motion with the support member;

a latch for receiving the latching bar and locking the headrest assembly in a use position, the latch adapted for mounting in the motor vehicle;

a detent for receiving the latching bar and securing the headrest assembly in a storage position, the detent adapted for mounting in the motor vehicle; and a headrest connected to the support member, wherein the headrest assembly is adapted to be movable between the use position over a vehicle seat back to support a vehicle occupant's head end a storage position against an interior side of the motor vehicle.

2. The headrest assembly of claim 1 wherein the headrest is pivotable about a generally vertical axis.

3. The headrest assembly of claim 1, wherein the headrest assembly is adapted to mount to a substantially vertical structural member of the motor vehicle.

4. The headrest assembly of claim 3, wherein the support member is a lower support member, and further comprising an upper support member, the upper and lower support members adapted to pivotally connect to the substantially vertical structural member in the motor vehicle.

* * * * *